United States Patent [19]

Trozzi

[11] 4,108,301
[45] Aug. 22, 1978

[54] MULTIPLE POINT FEEDER

[75] Inventor: Norman Kenneth Trozzi, West Caldwell, N.J.

[73] Assignee: Foster Wheeler Energy Corporation, Livingston, N.J.

[21] Appl. No.: 741,256

[22] Filed: Nov. 12, 1976

[51] Int. Cl.² .............................................. B65G 15/00
[52] U.S. Cl. ..................... 198/633; 198/637; 222/290; 222/408
[58] Field of Search ............... 198/356, 358, 362, 363, 198/367, 370, 372, 444, 445, 502–504, 565, 569, 599, 633, 636, 637, 525, 530, 534, 505, 531, 524, 634, 635; 222/55, 290, 27, 408, 415

[56] References Cited

U.S. PATENT DOCUMENTS

| | | | |
|---|---|---|---|
| 1,982,824 | 12/1934 | Miltenberger | 198/370 |
| 2,343,722 | 3/1944 | Wagner | 222/55 |
| 2,521,998 | 9/1950 | Rottier | 198/637 |
| 2,758,700 | 8/1956 | Plumb | 198/525 |
| 3,062,355 | 11/1962 | Sawada | 198/635 |
| 3,430,751 | 3/1969 | Bateson | 198/505 |

*Primary Examiner*—Joseph E. Valenza
*Attorney, Agent, or Firm*—Marvin A. Naigur; John E. Wilson

[57] ABSTRACT

A material handling system for distributing granular solids from a single source to a plurality of distribution points in which a plurality of selectively adjustable leveling bars control the thickness of a layer of material on a conveyor, and a plurality of arcuate-shaped guide chutes divert the material from the conveyor to the plurality of distribution points. The guide chutes are positioned longitudinally along the sides of the conveyor and their lateral positions are selectively adjustable relative thereto. The cooperative relationship among the height of the leveling bars, the lateral position of the guide chutes, and the speed of the conveyor determines the amount of material diverted from the conveyor to the individual distribution points. According to an alternate arrangement a constant thickness of the material layer is maintained and the selective position of the guide chutes is used to control the amount of material diverted.

6 Claims, 3 Drawing Figures

MULTIPLE POINT FEEDER

BACKGROUND OF THE INVENTION

This invention relates generally to material handling systems, and more particularly, to an apparatus for distributing granular solids from a single feed point to a plurality of distribution points.

There are numerous applications in which it is necessary to distribute a material from a single input source to a number of points. For example, in a boiler system, coal or some other suitable fuel may be fed to the boiler at a single point. It then becomes necessary to distribute this fuel in a predetermined, uniform quantity to a plurality of points where it is burned.

Mechanisms are known which are used to achieve this type of distribution. One example is a vibrating trough, such as the type used in dump-type feeders, wherein the coal or other type of granular solid fuel is fed into one end of the trough. The trough is then vibrated, either longitudinally or vertically, resulting in an intermittent, horizontal transfer of the material along the length of the trough. Positioned vertically relative to the trough are a plurality of vertical members defining vertical channels which divide and guide the material flowing down from the trough. This vibrating trough mechanism presents a number of problems and undesirable characteristics. Foremost, the quantity of feed is unpredictable inasmuch as the material has a tendency to adhere to the sides of the trough, and consequently the amount of material which is deposited within each vertical channel is not constant and can not be accurately controlled. Problems have also been encountered in providing adequate seals for the vibrating trough.

Material handling mechanisms are also known which are capable of delivering a uniform quantity of granular material to a single point, but lack the capability of uniform distribution of material to a plurality of points. Other systems are known which can deliver a quantity of material to a plurality of points of use. However, in the latter systems, the control of the quantity of material fed to each distribution point is not uniform nor accurately determinable.

Additional problems which are unique to the feed of fuel to boilers is the limited amount of space available in which to incorporate a system for feeding fuel to a plurality of burners. The space is generally on the order of several feet, and the fuel must be fed at a uniform and predetermined quantity.

SUMMARY OF THE INVENTION

It is therefore an object of the present invention to provide an improved material handling system which distributes granular solids from a single source to a plurality of points.

It is another object of the present invention to provide an improved granular solid distribution system which will deliver a uniform and predetermined quantity of material to each of a plurality of points.

Yet another object of the invention is to provide an improved distribution system for granular solids having independent and adjustable means to control the amount of material distributed to the plurality of points.

Still another object of the present invention is to provide an improved granular solid distribution system having the capability of adjusting for variations in the speed of feed and the consistency of the granular material.

A further object of the invention is to provide an improved distribution system for granular solids which is compact.

Briefly, these and other objects of the invention are attained by providing in a distribution system for granular solids a conveyor for moving the material from a single feed source, adjustable means to control the thickness of the layer of material at selected points of the conveyor, and a plurality of curved guide plows longitudinally located along the sides of the conveyor which divert a predetermined quantity of material from the conveyor. The lateral position of the plows from the sides of the conveyor successively approach the centerline of the conveyor to adjust for the reduced quantity of material further from the feed source. In an alternate arrangement, the material layer thickness is maintained constant and the quantity of material diverted at each distribution point is controlled by the lateral position of the guide plows.

DESCRIPTION OF THE PREFERRED EMBODIMENT

Figure 1:
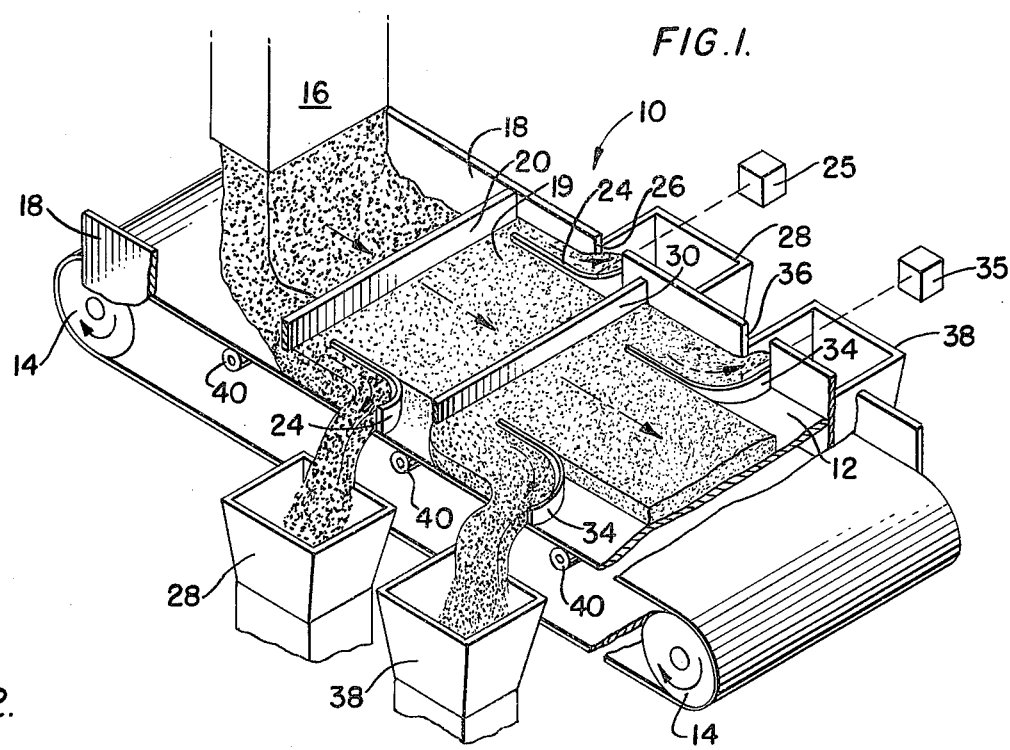
FIG. 1 is a pictorial view of the material handling system of the present invention.
Figure 2:
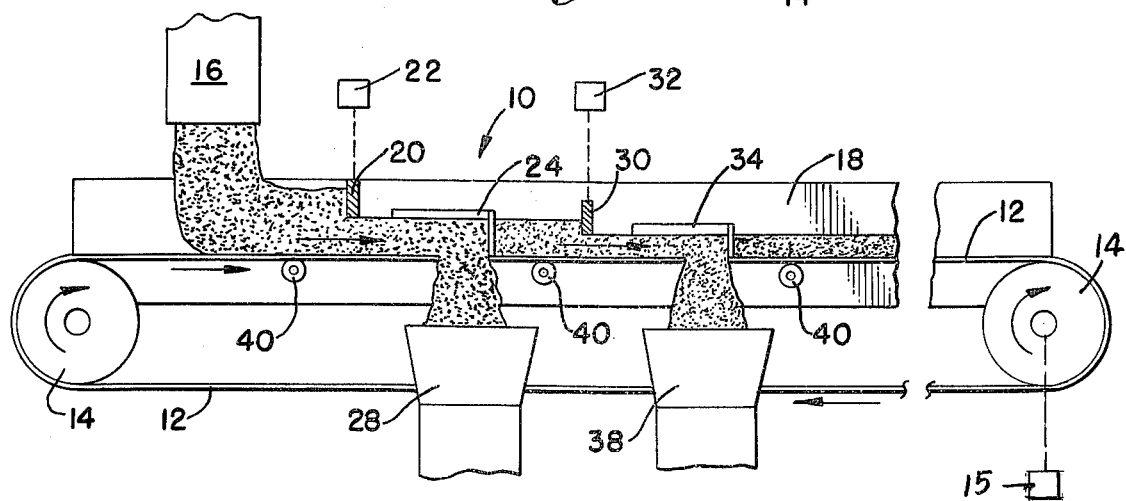
FIG. 2 is a side, elevational view of the invention shown in FIG. 1.

Referring now to FIGS. 1 and 2 of the drawings, there is shown a material handling system, denoted generally by the numeral 10, which is particularly adapted for distributing granular solids from a single feed source to a plurality of distribution points. The system shown includes an endless conveyor 12 extending over a pair of rollers 14, which operate in a conventional manner to move the conveyor in the direction indicated by the arrows. The speed of the conveyor 12 may be regulated in a conventional manner, such as by a controller 15 coupled to one of the rollers 14. A granular solid material is gravity fed continuously onto the upper surface of the conveyor 12 from a feeder duct 16 positioned over one end portion thereof. A pair of skirts 18 are mounted in any suitable manner adjacent to the edges of the conveyor 12 to prevent the granular solid material from falling off the sides of the conveyor.

Downstream from the location of the feeder duct 16 is a first leveling bar 20, which is suitably supported over the conveyor 12 and extends for the width of the conveyor between the skirts 18. Operatively connected to the leveling bar 20 is a controller 22, shown schematically in FIG. 2, which regulates the vertical position of the leveling bar above the conveyor 12. The leveling bar 20 spreads the granular solid material over the width of the conveyor 12 to establish a layer of material of a substantially constant, predetermined thickness as the material passes beneath the leveling bar.

Longitudinally located downstream of the leveling bar 20 is a first pair of curved diverter plates or plow blades 24, one on each side of the conveyor 12, which are positioned a predetermined distance laterally inboard from the skirts 18. Each of the skirts 18 is provided with an aperture 26 through which the downstream end of a corresponding plow blade 24 extends. It is understood that each of the plow blades 24 is mounted on suitable support means (not shown) of known construction and operation which permit adjustment of its lateral, inboard position, with the support means operatively connected to a plow blade position controller 25 which regulates the lateral adjustment of the plow blades.

Positioned adjacent to the conveyor 12 is a first pair of discharge hoppers 28, one on each side of the conveyor and in alignment with one of the corresponding plow blades 24, to receive the granular solid material diverted from the conveyor by the plow blades.

A second leveling bar 30 is positioned above the conveyor 12, downstream from the first pair of plow blades 24 and at a lower height than the first leveling bar 20. This second leveling bar 30 spreads the layer of granular solid material, which has been reduced in width by the portion diverted by the plow blades 24, the full width of the conveyor, but to a lesser thickness than that established by the first leveling bar 20. This is better shown in FIG. 2, and as with the first leveling bar 20, a corresponding controller 32 regulates the height of the leveling bar 30 above the conveyor 12, and therefore the thickness of the material.

A second pair of plow blades 34 is positioned longitudinally downstream from the second leveling bar 30, one on each side of the conveyor 12 and at a predetermined distance laterally inboard from a corresponding skirt 18. The downstream end of each of the plow blades 34 extends through a corresponding aperture 36 provided in each of the skirts 18. To ensure that a substantially constant amount of material is diverted by both sets of plow blades 24 and 34, the lateral inboard location of the second pair of plow blades 34 is somewhat greater than that of the first pair of plow blades 24 to adjust for the reduced thickness of the layer of granular solid material. In a fashion similar to that described above, each of the plow blades 34 is mounted on suitable support means (now shown) which permit adjustments in the lateral position of the plow blades, with such adjustments being regulated by an associated controller 35 cooperatively connected to the support means.

Adjacent to the conveyor 12 and substantially in receiving alignment with the plow blades 34 is a second pair of discharge hoppers 38 which receive the granular solid material diverted from the conveyor by the plow blades.

Although only four distribution points are shown, represented by the two pairs of discharge hoppers 28 and 38, the described alternating arrangement of leveling bars, plow blades and discharge hoppers can be repeated for the desired number of distribution points, with each successive leveling bar being positioned lower relative to the conveyor and with each successive pair of plow blades being positioned closer to the longitudinal centerline of the conveyor to ensure that a substantially constant, predetermined quantity of material is discharged into the hoppers.

The quantity of material diverted by each of the plow blades 24, 34, etc. is proportional to the layer thickness established by the leveling bars 20, 30, etc., the lateral position of the plow blades, and the speed of the conveyor. In synchronizing the system prior to use, the feed rate of material at the feeder duct 16 is established, a conveyor speed is selected, and the plow blades are initially positioned at their predetermined distances laterally inward from the skirts 18. The system is started, and the quantity of material discharged into each hopper 28, 38, etc. is measured by volume or weight, as the case may be, depending upon whether the volume or the weight of the granular solid material is controlling. Subsequently, adjustments are made in the lateral positions of the plow blades and/or the conveyor speed to establish the required quantity of material discharged into the invididual hoppers. During operation of the system, the material feed rate may vary as a result of variations in material density, moisture content, etc. Therefore, the level of the leveling bars, the conveyor speed, and the weight of the material layer as measured by a series of instrumented rollers 40 are continually monitored by known control equipment (not shown), which integrates the information and adjusts the conveyor speed and/or leveling bar heights by suitable control means, such as controllers 25 and 35, to maintain a substantially uniform and constant delivery of material at the discharge hoppers 28, 38, etc.

A greater degree of flexibility of adjustments may be provided for the positioning of the plow blades by having the leading edges of the plow blades suitably mounted on laterally-adjustable support means. These support means, while not shown in the drawings, can be of any conventional design known in the art, and may also be regulated by the controllers 25 and 35.

In operation, the conveyor 12 continuously removes the granular solid material from beneath the feeder duct 16 and moves the material from left to right, as shown in FIG. 2. As the material passes beneath the first leveling bar 20, it is spread the full width of the conveyor 12 to a thickness established by the height of the leveling bar above the conveyor. Subsequently, the granular solid material flows past the first pair of plow blades 24, and the predetermined quantity of material is diverted into each of the discharge hoppers 28 by the plow blades. As the granular solid material passes beneath the second leveling bar 30, the layer of material of the thickness established by the first leveling bar 20, but reduced in width by the portion of material diverted by plow blades 24, is again spread the full width of the conveyor to the thickness established by the height of the second leveling bar 30.

This layer of material flows past the second set of plow blades 34, which divert another quantity of material into each of the discharge hoppers 38. As indicated above, the second plow blades 34 and subsequent plow blades are positioned increasingly further in from the sides of the conveyor to ensure the distribution of a uniform quantity of material to each of the hoppers 38 despite the reduced thickness of the material layer as it passes under each successive leveling bar. In this fashion, the granular solid material is distributed from a single feed source to a plurality of distribution points in a predetermined and uniform quantity.

Figure 3:
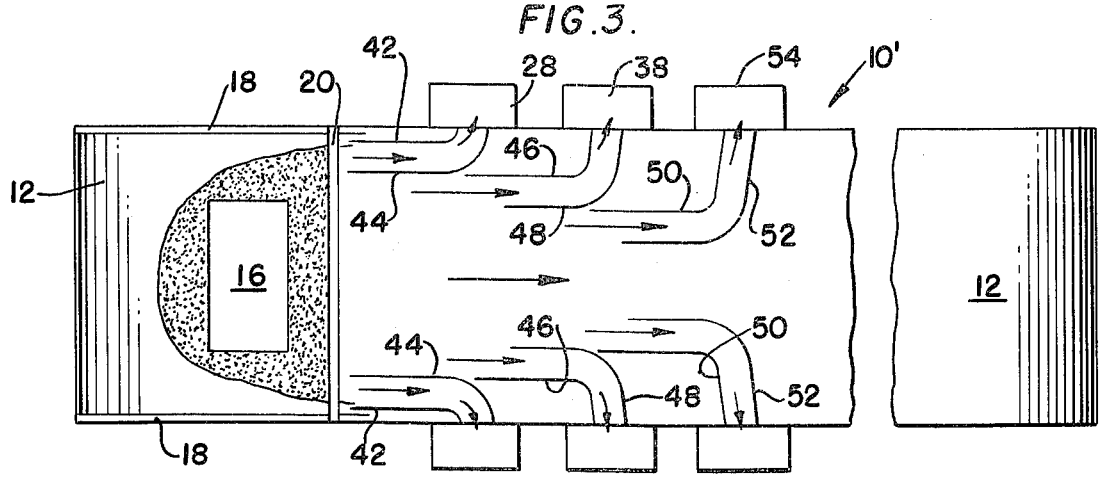
FIG. 3 is a plan view of an alternate embodiment of the present invention.

Shown in FIG. 3 is a schematic, plan view of an alternate embodiment of the system of the present invention, wherein many of the components are the same as the system 10 shown in FIGS. 1 and 2 and have correspondingly been designated with the same reference numerals. In the system 10' of this embodiment the thickness of the material layer is maintained constant by a leveling bar 20, and the quantity of material distributed at each of the multiple distribution points is adjusted by locating each subsequent pair of plow blades increasingly closer to the center of the conveyor. Longitudinally downstream of the leveling bar 20 and properly spaced on each side of the conveyor is a series of diverter chutes, with each chute being formed by two, parallel, curved diverter plates, such as 42 and 44, 46 and 48, etc. Considering now the series of chutes on one side of the conveyor 12, it being understood that the series of chutes on the other side is identical, the outboard plate of each chute, such as plate 42, serves as a skirt or fence to prevent the granular solid material from falling off the conveyor 12. In this regard, the skirt 18 on each side of the conveyor 12 extends longitudinally to a point just downstream from the location of the leveling bar 20. The laterally inward position of the inboard plate 44 is appropriately selected to establish this width of the strip of granular solid material diverted from the conveyor 12 into the discharge hopper 28. The outboard plate 46 of the next chute is longitudinally aligned downstream with the upstream inboard plate 44, with the inboard plate 48 being properly positioned inwardly for the correct width of granular solid material to be diverted into a hopper 38. Similarly, the positioning of the plates 50 and 52 are established as for the plates 46 and 48, respectively, to divert the material into a discharge hopper 54.

While only three pairs of diverter chutes are shown in FIG. 3, it is understood that the necessary numbers are incorporated into the material handling system 10' as required. The curvature of the diverter plates 42-52 must be gradual so that the conveyor can push the layer of material into and along each of the chutes and into the discharge hoppers 28, 38, and 54.

The advantage of the alternate embodiment shown in FIG. 3 is the reduction in the number of components since only one leveling bar is needed to establish a single thickness of the bed which does not vary as the material is moved along the conveyor. The quantity of material diverted to each of the discharge hoppers is controlled by the lateral position of the chutes.

The operation of the embodiment of FIG. 3 is substantially the same as the embodiment of FIGS. 1 and 2, except that a substantially constant thickness for the layer of granular solid material is established by the height of the leveling bar 20. This layer thickness is not changed, and the quantity of material diverted to the discharge hoppers 28, 38, 54, etc. is controlled primarily by the lateral positions of the diverter chutes 42-52, etc.

While not shown in the drawings to enhance the clarity of presentation, it is understood that the material handling system 10 and 10' and the necessary equipment associated therewith are appropriately mounted and supported to permit operation and cooperation in substantially the manner herein described.

Of course, variations of the specific construction and arrangement of the material handling systems disclosed above can be made by those skilled in the art without departing from the invention as defined in the appended claims.

What is claimed is:

1. A material handling system for distributing granular solids from a single source to a multiplicity of points, comprising:
    a conveyor for transporting the material from a feed source;
    a plurality of pairs of arcuate-shaped deflectors, each pair of deflectors being spaced longitudinally along and adjacent the sides of said conveyor for diverting quantities of material toward the sides of said conveyor;
    a hopper disposed adjacent to each of said deflectors for receiving the diverted quantity of material; and
    a plurality of leveling bars positioned above said conveyor for controlling the thickness of the layer of material on said conveyor, said leveling bars being alternately spaced in the longitudinal direction with respect to said pairs of deflectors to redistribute on the conveyor the material remaining downstream of each pair of said deflectors to provide a layer of material of uniform thickness,
    whereby the cooperative relationships among the vertical positions of the leveling bars and the lateral positions of the deflectors accurately control the precise amounts of material diverted from the conveyor to said hoppers.

2. The material handling system of claim 1, wherein the position of each of said deflectors is selectively adjustable relative to the sides of said conveyor, and said system further includes means for adjustably positioning said deflectors.

3. The material handling system of claim 1 wherein each of said longitudinally positioned leveling bars is positioned successively closer vertically to said conveyor to provide a uniform layer of material of different thickness at different longitudinal positions along the conveyor, the layer of material extending the width of the conveyor.

4. The material handling system of claim 3, wherein the vertical position of each of said leveling bars is selectively adjustable relative to said conveyor, and said system further includes means for adjustably positioning said leveling bars.

5. The material handling system of claim 4, wherein the longitudinal speed of said conveyor is selectively adjustable to vary the feed rate of material, and said system further includes means for adjusting the speed of said conveyor.

6. The material handling system of claim 1, wherein each successive pair of deflectors is spaced laterally inwardly relative to the sides of said conveyor in the direction of movement of said material so that a substantially equal amount of material is diverted by each deflector to said hopper.

* * * * *